US008041099B2

(12) United States Patent
    Abed

(10) Patent No.: US 8,041,099 B2
(45) Date of Patent: *Oct. 18, 2011

(54) CHECK VERIFICATION SYSTEM

(76) Inventor: Emad Y. Abed, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/011,175

(22) Filed: Jan. 21, 2011

(65) Prior Publication Data

US 2011/0125639 A1     May 26, 2011

Related U.S. Application Data

(63) Continuation of application No. 08/259,859, filed on Jun. 15, 1994, now Pat. No. 7,899,234.

(51) Int. Cl.
   *G06K 9/00*        (2006.01)
(52) U.S. Cl. .......................................... 382/137; 705/16
(58) Field of Classification Search .................. 382/137, 382/138, 139, 140; 705/16, 35; 902/22
See application file for complete search history.

(56) References Cited

U.S. PATENT DOCUMENTS

| 4,187,498 | A | 2/1980 | Creekmore ............... 340/149 A |
| 4,346,442 | A | 8/1982 | Musmanno ................... 364/408 |
| 5,175,682 | A | 12/1992 | Higashiyama et al. ....... 364/408 |
| 5,220,501 | A | 6/1993 | Lawlor et al. ................. 364/408 |
| 5,231,569 | A | 7/1993 | Myatt et al. ................... 364/408 |
| 5,237,620 | A | 8/1993 | Deaton et al. ..................... 382/7 |
| 5,239,662 | A | 8/1993 | Danielson et al. ............ 395/800 |
| 5,256,863 | A | 10/1993 | Ferguson et al. ............. 235/383 |
| 5,412,190 | A | 5/1995 | Josephson et al. ............ 235/379 |

*Primary Examiner* — Andrew W Johns
(74) *Attorney, Agent, or Firm* — Altera Law Group, LLC

(57) ABSTRACT

A check verification system for verifying checks presented to a vendor at a vendor location, the vendor location being remotely located from a bank issuing the checks, the check verification system comprising: an input device located at the vendor location, the input device having means for collecting check information including an amount of the check and an account number; and means for communicating with the bank to verify that the account number corresponds to an account of a plurality of legitimate accounts with the bank and provide a hold upon funds in the account in the amount of the check if the account number corresponds to one of the legitimate accounts with the bank and if sufficient funds exist in the legitimate account to hold.

33 Claims, 4 Drawing Sheets

CHECK VERIFICATION SYSTEM

BACKGROUND OF THE INVENTION

The present invention relates to electronic verification of financial instruments, and more specifically to a system of reserving funds in customer banking accounts during check verification by a vendor.

The use of personal checks by customers to purchase goods or services from vendors is well known. The ability of individual vendors to accept these checks is limited by the degree of certainty that the vendor can collect the amount written upon the check from the bank issuing the check. More specifically, the ability to verify that the customer writing the check is in fact the valid user of the checking account and that the account is valid with sufficient funds is of paramount concern to the vendor of the goods and services.

These concerns have given rise to a multiplicity of systems, methods and procedures used by vendors, banks and outside service bureaus to validate and verify that the amount written on the check will be paid in due course to the vendor. Each solution has attempted to solve the problem of check payment with varied success.

The most basic of check verification systems is that the vendor only accepts the checks from a limited area and/or from a specific listing of financial institutions. This system may even be more restrictive by only accepting checks from persons preapproved or known to the vendor. This system allows the vendor to limit the vendor's inability to collect from customers who may be outside the practical legal reach of the vendor (e.g. outstate customers) Unfortunately, this system does not prevent loss due to fraud or insolvent customers within the check accepting range.

Another more sophisticated system requires that a check approval service verify the check when presented. Check approval comes from comparing the account number on a personal check with a listing of all possible valid account numbers from a geographic region or from comparing records against a list of account numbers that have been identified as being unsafe or unreliable. In either configuration, a check approval system still does not enhance the ability of the vendor to prevent check fraud or newly insolvent customers from presenting an invalid check to the vendor.

Check verification systems have been patented to accomplish the recording of check account numbers, transmittal to financial institutions, generation of local check approval files for specific customers, and in-store Local Area Network (LAN) systems. (E.g., U.S. Pat. Nos. 4,187,498; 5,256,863; 5,175,682; 5,201,010) These patents identify several problems associated with the actual account verification of each check as it is received.

One problem with check verification is the inability of a verification system to verify or debit the amount of funds present in the account at the time of purchase. The account information is generally protected and requires permission by the account holder to be accessed by a non-privileged party.

An unlikely problem arises in a debit card solution designed to eliminate the usage of paper checks and the delay inherent in checking account funds transfer. The debit card assures that the customer has a current account with valid amounts of credit on the debit card. These debit cards are similar to credit cards with the significant difference that the customer can only charge or debit the amount that is currently available in the checking account at the issuing financial institutions. The use of a debit card is equivalent to the use of a credit card with real time verification via telecommunication link to the issuing financial institution. The card has advantages of limiting the amount that can be withdrawn from the account and guaranteeing to the vendor that the amount withdrawn will be paid. The purchase amount from a debit card is electronically transferred to the vendor's account without the delay that normal checks require to transfer the funds from the customer's account. This debit card system is largely ideal for the vendor and the financial institution involved. The debit card has the potential to eliminate many human errors present in the current system of checking account funds transfer. Unfortunately, debit cards have not achieved widespread popularity with the consumer. It can readily be appreciated that instant transfer for many consumers is not desirable as the customer may only be able to deposit funds to the checking account on a monthly or biweekly basis while incurring debt on an essentially continuous or daily basis. Therefore, there is a need to preserve the check cashing methodology as it currently exists and yet allow the vendor the added security to assure payment of checks in the normal course of business.

SUMMARY OF THE INVENTION

The present invention provides a check verification system for verifying checks presented to a vendor at a vendor location. The vendor upon presentation of a check enters an amount of the check, an account number from the check and communicates with a bank identified by the check account number. The vendor then reserves the amount of the check in the bank account if the checking account is found to be valid.

The preferred embodiment of this system reserves, but does not debit, a customer's checking account at the customer's bank. The benefit of this reservation ensures that the vendor will receive the funds within a normal check processing time span, while the customer is allowed to continue the current practice of writing checks in anticipation of payment.

The scope of implementation of this system can be scaled to the desired use. In its basic configuration, the system could be implemented in a single business serving a small or limited area and dealing with only a small group of banks in a very local or rural usage. The equipment for the verification system could be accommodated by existing space in a business. The system can be expanded to serve additional vendors and banking institutions within a larger geographic area. Ultimately, the system is most effective when the scope of coverage will allow any check that is presented to the vendor from any customer to be verified and reserved. Specialized data networks (e.g. Internet or any similar network system) can be used to allow any vendor to access any bank for verification and reservation of funds against the tender of any customer's check.

DETAILED DESCRIPTION OF THE PREFERRED EMBODIMENTS

Figure 1:
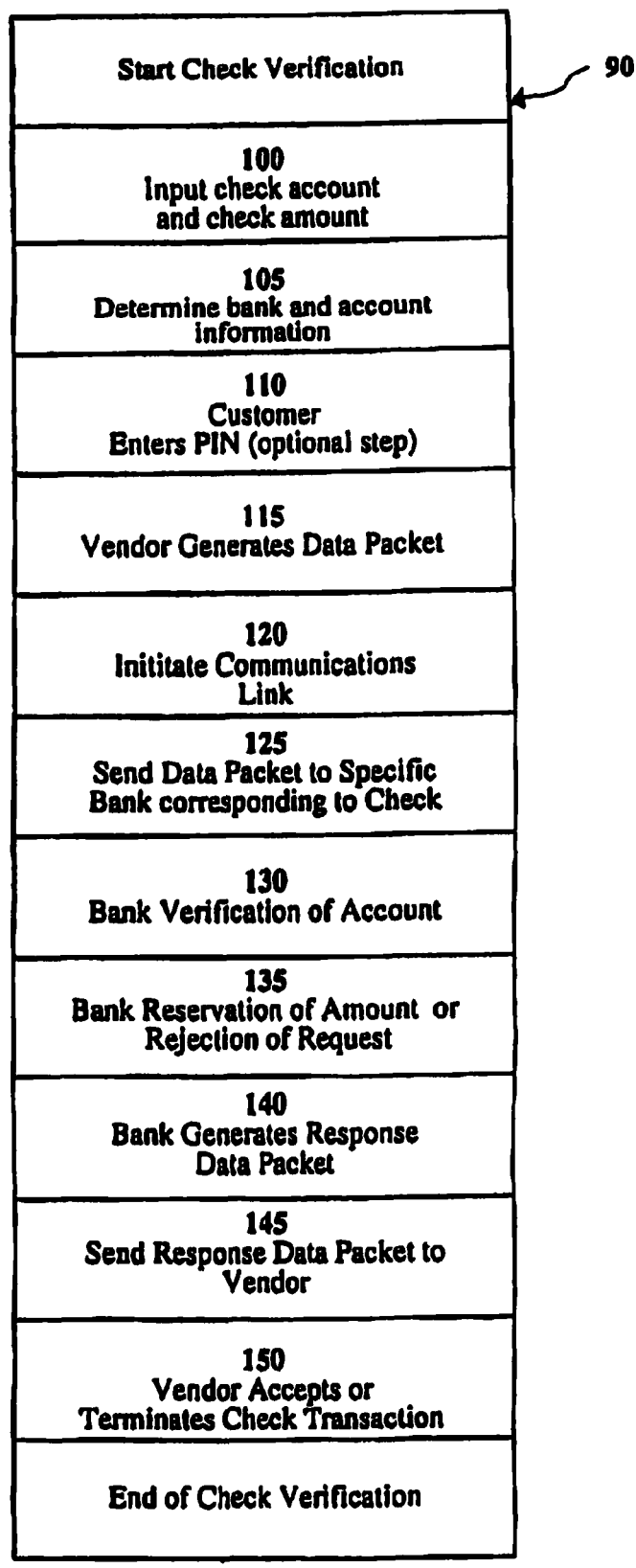
FIG. 1 is a flow chart illustrating operation of a check verification system of the present invention.

FIG. 1 illustrates operation of a check verification system of the present invention according to a procedure indicated generally at 90. A vendor receives a check from a customer at either a Point of Sale (POS) terminal (e.g. a standard electronic cash register) or any other data entry location at the vendor's location at step 100, obtaining the account number and the amount of the check. Preferably, the check is processed in a check reader illustrated in FIG. 2A at 102. The preferred check reader 102 comprises a Magnetic Ink Character Reader (MICR). The MICR reads the account number line from the check. The information fields contained on the MICR line on a check comprises the following standard information: (1) the transit number or bank number, which is a unique number assigned to each individual bank used by the Federal Reserve System to process checks to the appropriate bank; (2) the account number of the customer's checking account at the specific bank identified by the transit number; and (3) the number of the individual check that is being tendered. The amount of the check tendered is entered by an operator having a keypad 112, illustrated in FIG. 2A. In step 105, the account number on the check is broken out into its respective bank number and the checking account number.

If desired, a Personal Identification Number (PIN) may be entered by the customer signifying a grant of permission to access the bank accounts of the customer for the amount of purchase at step 110. In its preferred embodiment, the keypad 112 (FIG. 2A), similar to that of an automated teller machine (ATM), faces the customer at the POS terminal for the entry of the PIN. At this time, the PIN keypad 112 should be concealed from the view of the POS input and other customers' view. The purpose of the PIN is primarily to prevent misuse of the verification system by the vendor or the vendor's agents. By entering the PIN, the customer is providing an access code to be transmitted to the customer's bank to ensure that the actual account holder is making the purchase and is granting permission to the bank to reserve the amount before the check actually reaches the bank. If desired, a guarantee card (similar to current ATM cards) having a magnetic strip storing required information to establish that the user is the account holder can be inserted through a slot 112A as an additional or alternative verification step wherein the PIN number must match with the guarantee card. Of course, the check reader 102 is not necessary because the bank number, the account number, the amount of the check and the PIN number could be entered using only the keypad 112.

Figure 2:
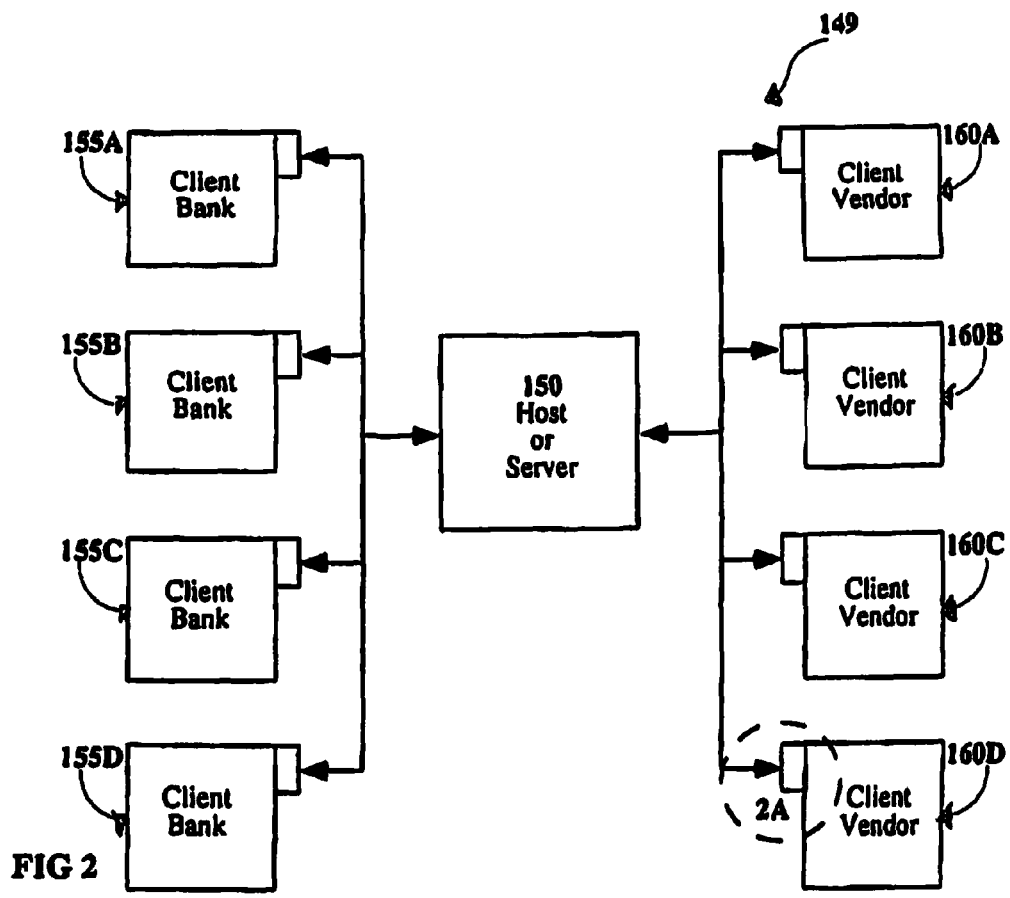
FIG. 2 is a block diagram of a first embodiment of the check verification system of the present invention.
Figure 2A:
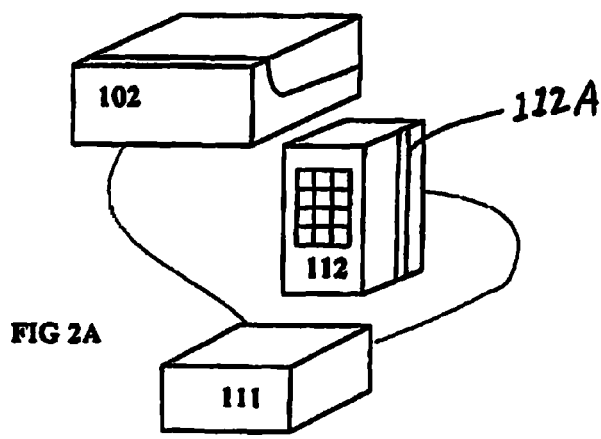
FIG. 2A is an enlarged portion of FIG. 2.

A data packet is generated at step 115 for transfer once a communication link has been initiated at step 120 using a suitable modem 111 illustrated in FIG. 2A. Of course, other forms of data transmission to be used other than packetization.

The data packet is transmitted to a server, described below, or directly to the bank, and includes the individual checking account number, the amount of the check, and the individual's personal identification number (PIN), if present. Other information such as a code identifying the merchant, security, parity and check sum can be added to the data packet as needed.

When a communication link is made, the data packet, is sent and decoded by a receiving server at step 125. The account number is verified as a legitimate account of the bank, and that the amount requested is present in the account, at step 130. The amount requested is reserved at step 135 in anticipation of the check's arrival several days later. If there are insufficient funds to reserve, the bank at its discretion may reserve the amount in anticipation of an upcoming deposit by the customer, or deny the reservation request. Preferably, the bank generates a response data packet at step 140 and transmits the response data packet at step 145 back to the vendor. The response data packet is displayed by a suitable display device 111 indicating action taken by the bank.

Once the check is verified, the transaction is completed with the check being sent to the vendor's bank in the normal course of business. At this point in the transaction, other benefits may be realized by the bank, the vendor and the customer if a PIN is used by the system. The bank and vendor receive greater assurances that the customer presenting the check is in fact the holder of the account at the bank and that the money that forms the basis of the transaction is real. Likewise, the customer is assured that the vendor cannot place false or harassing claims upon the checking account. Furthermore, if the checkbook is lost or stolen, fraudulent purchases are also prevented.

Figure 3:
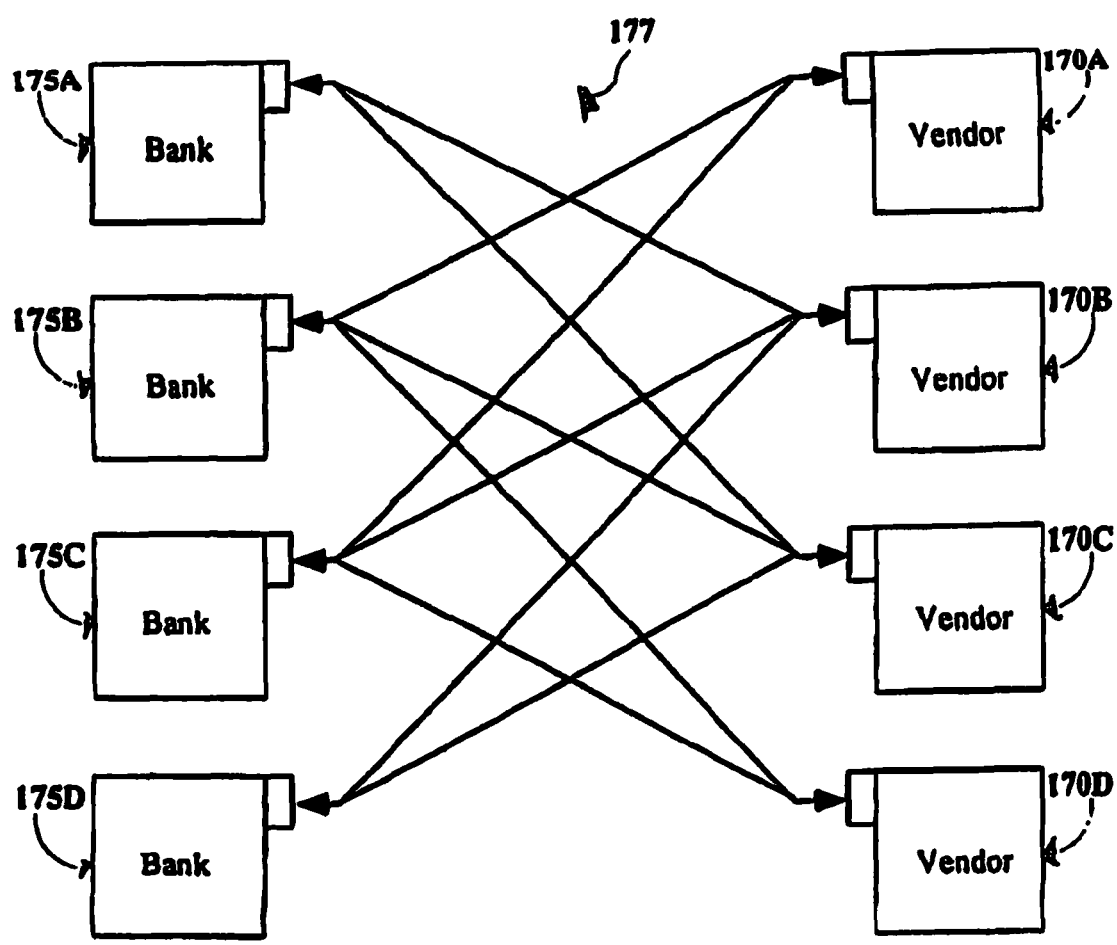
FIG. 3 is a block diagram of a second embodiment of a check verification system of the present invention.

Referring now to FIG. 2 and FIG. 3, the preferred embodiments of communication networks are illustrated. The preferred communication mode comprises two basic architectures, the client/server illustrated in FIG. 2 and the discrete node system illustrated in FIG. 3. Each system architecture will utilize existing telecommunication technology. Preferably, each system will use an automated modem system that operates essentially transparently to the operator of the system. Each remote vendor location will call the respective host or remote bank location, establish communication protocols, deliver the check information (vendor generated data packet), and receive the respective site's reply (response data packet).

Referring now to FIG. 2, a client/server network 149 includes a star style communication network connected to a central server 150. The server 150 acts as a host that establishes connections between the respective banks, illustrated generally at 155A, 155B, 155C, 155D, and vendors, illustrated generally at 160A, 160B, 160C, 160D. The central server 150 can be physically located on the vendor's location, for instance if the vendor has a central location for a number of retail locations, or in the form of a commercial subscription service. The benefit of a subscription server design allows both the vendors and the banks to subscribe to the service without investing in substantial additional equipment. The server 150 is also able to control and sequence the separate vendor generated data packets and response data packets in the most cost and time efficient manner to control a large volume of transmitted information.

The server 150 requires that each vendor 160A-160D send the data packet 125 with the bank account number, amount of the check and, if desired, the PIN of the customer. Each vendor 160A-160D is only required to possess equipment that obtains the check information, calls the server 150 and is able to send and receive the data packets from the server 150. Each bank 155A-155D is similarly benefited by not requiring significant additional telecommunication equipment as a capital expenditure. After determining which bank the check issued from, the server 150 calls the bank. If desired, a constant communication link is used, depending on the volume of transactions between the bank and server 150. The bank performs the necessary actions and responds to the server 150 with the response data packet. In turn, the server 150 replies to the client vendor with a response.

The alternative preferred mode of operation is a wide area network that does not use a central server to control the sending and receiving of each vendor's data packets. Referring to FIG. 3, each vendor 170A, 170B, 170C, 170D and each respective bank 175A, 175B, 175C, 175D form a separate node of the network 177. This embodiment requires that each vendor 170A-170D of the network 177 be capable of independently communicating with any bank 175A-175D that issues a checking account. This embodiment of the present invention requires a larger initial investment by each vendor 170A-170D and each bank 175A-175D.

Figure 4:
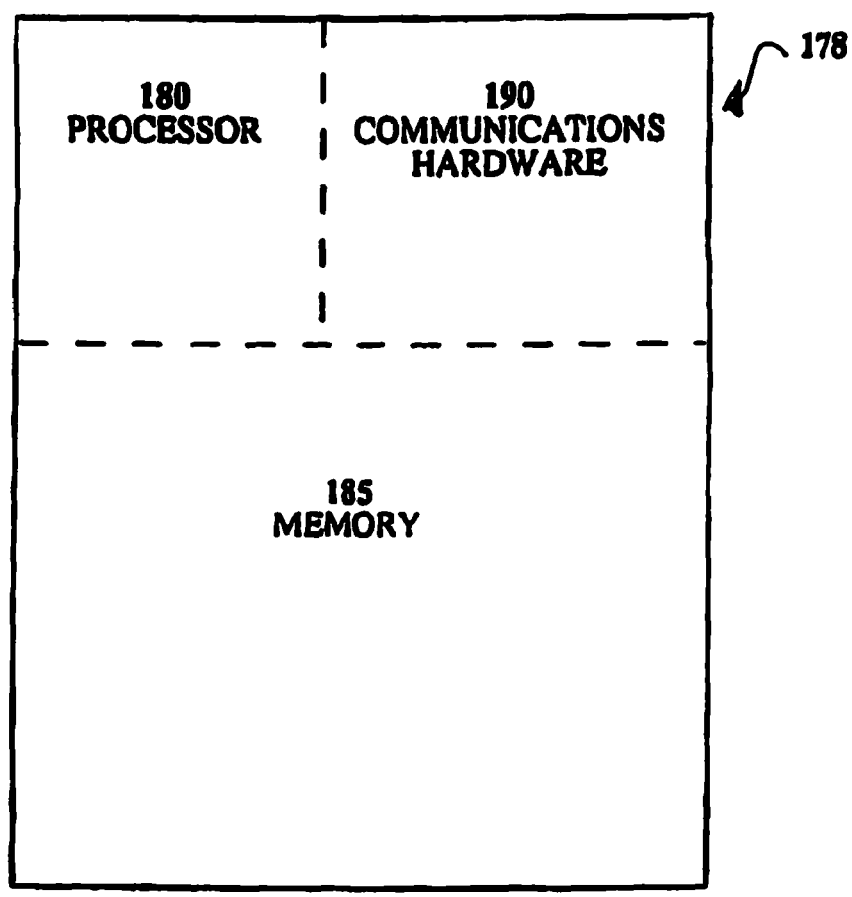
FIG. 4 is a block diagram of a check reader.

Referring also to FIG. 4, the technology requirements are easily satisfied at each vendor location 170A-170D with a check reader 178 comprising, in addition to suitable hardware to read the checks, not shown, a computer processor 180 with sufficient memory storage 185 to store data that allows the check reader 178 to call any bank 175A-175D of the system with suitable telecommunications hardware 190 adaptable to an automated or semiautomated operational environment. The keypad 112 is connected for the entry of the check amount and for the consumer's. PIN, if desired. The check reader 178 has sufficient memory 185 to determine the issuing bank's identity as well as how to connect with the appropriate bank. Once the identity of the bank is established, the check reader 178 generates and transmits the data packet to the issuing bank, and displays the verification message from the bank. An alternative embodiment would allow the check reader 178 to read from commonly available data storage devices (i.e., a CD-ROM or other mass memory storage devices) that are able to store the required bank communication information. The benefit of this system would allow the infrequent user of the verification system to verify a check for a higher initial cost without having to pay a periodic cost to use or subscribe to a central server verification system.

The above described invention's configurations are merely an illustrative example of the principles underlying the present invention. To one skilled in the art, numerous modifications and adaptations thereof are readily apparent without departing from the scope and spirit of the present invention. The above-described method and apparatus describe an invention that allows a vendor or a multitude of vendors to assure payment of checks, while allowing a customer or a multitude of customers to continue to pay for goods in a manner that is both familiar and comfortable to use.

Although the present invention has been described with reference to preferred embodiments, workers skilled in the art will recognize that changes may be made in form and detail without departing from the spirit and scope of the invention.

What is claimed is:

1. A method for verifying, reserving and debiting a check presented by a customer written on the customer's bank to a vendor, the check having a bank number, an account number and an amount payable, comprising:

providing an input device at the vendor for collecting check information;

collecting check information with the input device, the check information comprising a bank transit number, an account number of the customer's checking account and a payable amount of the check;

establishing a communication link between the input device and the bank corresponding with the bank transit number;

generating a data packet comprising the check information;

transmitting the data packet from the vendor to the customer's bank with the communication link;

receiving the data packet at the customer's bank;

verifying, at the customer's bank, the check information in the data packet;

securing reservation of funds in the amount of the check at the customer's bank if the account number corresponds to a legitimate account with the bank and if sufficient funds are in the legitimate account to cover the amount of the check;

allowing the check to process in a normal checking processing time span; and causing change to the legitimate account, the change comprising debiting the legitimate account, clearing the check and cashing the check.

2. The method of claim 1, wherein the vendor comprises a bank.

3. The method of claim 1, further comprising transmitting bank verification of check information to the vendor using the communications link;

4. The method of claim 1, further comprising the vendor accepting or terminating the check transaction.

5. The method of claim 1, further comprising sending the check in the normal course of business to the vendor's bank if the check transaction is accepted.

6. The method of claim 5, further comprising sending the check in the normal course of the business to the customer's bank.

7. The method of claim 1, further comprising processing the check through the Federal Reserve System to the customer's bank. communication link connecting with a data network including any bank.

8. The method of claim 1, further comprising the communication link connecting with a data network including any bank.

9. The method of claim 8, further comprising the data network comprising the Internet.

10. The method of claim 1, further comprising the customer granting permission to secure reservation of funds.

11. The method of claim 1, wherein the communication link is internet-based.

12. The method of claim 1, wherein the input device further comprises collecting payment information.

13. A method for processing a check through the Federal Reserve System, wherein the check is presented by a customer written on the customer's bank to a vendor, the check having a bank number, an account number and an amount payable, comprising:

providing an input device at the vendor for collecting check information and/or payment information;

collecting check information with the input device, the check information comprising a bank transit number, an account number of the customer's checking account and a payable amount of the check;

establishing a communication link between the input device and the bank corresponding with the bank transit number;

generating a data packet comprising the check information;

transmitting the data packet from the vendor to the customer's bank with the communication link;

receiving the data packet at the customer's bank;

verifying, at the customer's bank, the check information in the data packet;

securing reservation of funds in the amount of the check at the customer's bank if the account number corresponds to a legitimate account with the bank and if sufficient funds are in the legitimate account to cover the amount of the check;

allowing the check to process in a normal checking processing time span, including processing the check from the vendor's bank through the Federal Reserve System; and debiting the legitimate account, clearing the check and cashing the check.

14. The method of claim 13, wherein the vendor comprises a bank.

15. The method of claim 13, further comprising transmitting bank verification of check information to the vendor using the communications link.

16. The method of claim 13, further comprising the vendor accepting or terminating the check transaction.

17. The method of claim 13, further comprising sending the check in the normal course of business to the vendor's bank if the check transaction is accepted.

18. The method of claim 13, further comprising processing the check through the Federal Reserve System to the customer's bank.

19. The method of claim 13, further comprising the communication link connecting with a data network including any bank.

20. The method of claim 19, further comprising the data network comprising the Internet.

21. The method of claim 13, further comprising the customer granting permission to secure reservation of funds.

22. The method of claim 13, further comprising sending the check in the normal course of the business to the customer's bank.

23. The method of claim 13, wherein the communication link is internet-based.

24. A method for verifying, reserving and debiting a check presented by a customer written on the customer's bank to a vendor bank, the check having a bank number, an account number and an amount payable, comprising:
   providing an input device at the vendor bank for collecting check information;
   collecting check information with the input device, the check information comprising a bank transit number, an account number of the customer's checking account and a payable amount of the check;
   establishing a communication link between the input device and the bank corresponding with the bank transit number;
   generating a data packet comprising the check information;
   transmitting the data packet from the vendor bank to the customer's bank with the communication link;
   receiving the data packet at the customer's bank;
   verifying, at the customer's bank, the check information in the data packet;
   securing reservation of funds in the amount of the check at the customer's bank if the account number corresponds to a legitimate account with the bank and if sufficient funds are in the legitimate account to cover the amount of the check;
   allowing the check to process in a normal checking processing time span; and
   causing change to the legitimate account, the change comprising debiting the legitimate account, clearing the check and cashing the check.

25. The method of claim 24, further comprising transmitting bank verification of check information to the vendor bank using the communications link.

26. The method of claim 24, further comprising the vendor bank accepting or terminating the check transaction.

27. The method of claim 24, further comprising sending the check in the normal course of business to the vendor's bank if the check transaction is accepted.

28. The method of claim 24, further comprising processing the check through the Federal Reserve System to the customer's bank.

29. The method of claim 24, further comprising the communication link connecting with a data network including any bank.

30. The method of claim 29, further comprising the data network comprising the Internet.

31. The method of claim 24, further comprising the customer granting permission to secure reservation of funds.

32. The method of claim 24, wherein the input device comprises a check reader further comprising a computer processor with sufficient memory storage to store data for determining the identity of the bank corresponding with the bank transit number, generating the data packet and establishing an internet-based communication link between the check reader and the bank corresponding with the bank transit number.

33. The method of claim 24, wherein the communication link is internet-based.

* * * * *